(12) United States Patent
Ohta et al.

(10) Patent No.: US 7,673,943 B2
(45) Date of Patent: Mar. 9, 2010

(54) SEAT RECLINING APPARATUS FOR VEHICLE

(75) Inventors: Hiroki Ohta, Shizuoka (JP); Toshihiro Kimata, Aichi (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 427 days.

(21) Appl. No.: 11/709,192

(22) Filed: Feb. 22, 2007

(65) Prior Publication Data

US 2007/0200408 A1 Aug. 30, 2007

(30) Foreign Application Priority Data

Feb. 28, 2006 (JP) ............................ 2006-051935

(51) Int. Cl.
*B60N 2/02* (2006.01)
(52) U.S. Cl. ................................. 297/362.11
(58) Field of Classification Search ............ 297/362.11, 297/361.1
See application file for complete search history.

(56) References Cited

U.S. PATENT DOCUMENTS 7,354,108 B2 * 4/2008 Matsumoto et al. ......... 297/362

7,500,719 B2 * 3/2009 Kojima ....................... 297/362
7,520,568 B2 * 4/2009 Hoshihara et al. ........... 297/367

FOREIGN PATENT DOCUMENTS

GB 2002489 A * 2/1979
JP 2005-278983 10/2005

* cited by examiner

*Primary Examiner*—Milton Nelson, Jr.
(74) *Attorney, Agent, or Firm*—Foley & Lardner LLP

(57) ABSTRACT

A seat reclining apparatus for a vehicle, including a stationary bracket and a movable bracket provided integral with a seat cushion and seat back, respectively. The movable bracket is equipped with a driving device. A speed-reduction unit is provided including an input shaft, a stationary member and a movable member. A forward-inclination mechanism is provided including a lock plate, an engaging-disengaging device and a restrictive device. The engaging-disengaging device is adapted to bring the lock plate and the movable bracket into one of an engagement state and a disengagement state. The movable bracket is connected to the stationary bracket through the speed-reduction unit and the forward-inclination mechanism. The seat reclining apparatus is further provided with a limit switch for powering off the driving device when the movable bracket and the lock plate are brought into the disengagement state.

2 Claims, 8 Drawing Sheets

SEAT RECLINING APPARATUS FOR VEHICLE

BACKGROUND OF THE INVENTION

This invention relates to improvements in a seat reclining apparatus for a vehicle, in which an electrically operated type-seat reclining apparatus provided with a forward-inclination mechanism is arranged to be the same in basic arrangement as a manually operated type-seat reclining apparatus thereby to enable commonality of most of components.

In a seat reclining apparatus for a vehicle, a differentially transmitting mechanism (or a differential gear) is employed as a mechanism for adjusting the angle of inclination of a back seat, so that the back seat can be electrically and rotationally moved at a high reduction ratio.

A seat reclining apparatus for a vehicle, employing the arrangement of the differentially transmitting mechanism, is disclosed in Japanese Patent Provisional Publication No. 2005-278983. In addition to an operation for changing the angle of inclination of the seat back, this seat reclining apparatus for the vehicle is further adapted to instantaneously make the seat back fall forward, for example, when an occupant gets on a two door or coupe type vehicle to take a rear seat from a front door (or when an occupant in the rear seat gets off such a vehicle at the front door). This seat reclining apparatus is arranged as follows.

The commonly known seat reclining apparatus as disclosed in the above patent publication is arranged including: a base plate provided on a seat cushion side; an outer toothed plate attached through an eccentric shaft in such a manner as to be rotatable relative to the base plate and not to be eccentric relative to the base plate, and having external teeth; an inner toothed plate having internal teeth including one or two more number of teeth than the outer toothed plate; an arm plate provided to be integral with the inner toothed plate and attached to a seat back; and a motor provided to the seat back for driving the eccentric shaft. The eccentric shaft has eccentric sections supporting the inner toothed plate and the arm plate eccentrically rotatable relative to the outer toothed plate, and is to move a mesh portion (where the inner toothed plate is meshed with the outer toothed plate) along the circumference.

In the above-discussed seat reclining apparatus, the base plate and the outer toothed plate are in a relationship, in which a first pin and a latch plate are brought into contact with two extending parts of the outer toothed plate so as to lock the outer toothed plate. Further, a relationship among the outer toothed plate, the inner toothed plate and the arm plate is such as to be able to rotate the inner toothed plate and the arm plate together within a range in which second and third pins can be brought into contact with the two extending parts.

More specifically, when an operation is carried out for changing the angle of inclination of the seat back, the outer toothed plate is locked by the first pin and the latch plate, and additionally the inner toothed plate and the arm plate are rotated relative to the outer toothed plate in either of two directions by the motor and a differentially transmitting mechanism. In another operation for inclining the seat back to fall forward, the latch plate is rotated to release the outer toothed plate, thereby allowing the inner toothed plate and the arm plate to fall forward together with the outer toothed plate. When the seat back is pulled to be raised up, the inner toothed plate and the arm plate are pulled to be raised up while the outer toothed plate is rotated back into position. With this, the latch plate is reset so as to lock the outer toothed plate again.

SUMMARY OF THE INVENTION

However, drawbacks have been encountered in the above conventional seat reclining apparatus. More specifically, the seat reclining apparatus as disclosed in Japanese Patent Provisional Publication No. 2005-278983 is not versatile because of its complicated arrangement in which the differentially transmitting mechanism and a forward-inclination mechanism are intertwined with each other. Meanwhile, the seat reclining apparatus has two manners of changing the angle of inclination of the seat back, an electrically operative manner applying the differentially transmitting mechanism as discussed above, and a manually operative manner applying a lock-unlock mechanism adapted to release the seat back from a lock state when the seat back is manually and rotationally inclined to reach a preferable position and to lock the seat back again. With this, it is required to accomplish the commonality of components used in either manner.

An arrangement is proposed in order to meet this requirement, in which a reduction unit and the lock-unlock mechanism are unitized to be a circular unit and axially fixed to a stationary bracket provided integral with the seat cushion and to a movable bracket provided integral with the seat back, respectively. In this arrangement, a lock plate is connected integral with the reduction unit and constitutes the forward-inclination mechanism. The movable bracket is adapted to be disengaged from the lock plate when the seat back is inclined to fall forward, thereby being brought into a condition of rotating forward.

However, further drawbacks have been encountered in the case where the forward-inclination mechanism is connected to the thus circularly unitized reduction unit. Specifically, when the motor is energized to be operated under the above-discussed condition (where the movable bracket is rotated forward), the lock plate is so rotated in either of two directions as to exceed an engageable range in which the lock plate is engageable with the movable bracket. It has been therefore necessary to dispose a stopper at both ends of the engageable range in order not to rotate the lock plate beyond the engageable range.

However, in a case of rotationally raising the seat back up to engage the movable bracket with the lock plate, an output shaft of the motor is to be rotated together with the rotational movement of the seat back since the motor is integrated into the seat back, i.e., a member on a rotationally moved side. Accordingly, when the motor operated under a state where the seat back falls forward brings the lock plate into contact with the stopper, the lock plate is to be rotated further though in contact with the stopper, thereby rupturing a driving section of the motor.

In view of the above, an object of the present invention is to provide an improved seat reclining apparatus for a vehicle which apparatus can effectively overcome drawbacks encountered in conventional seat reclining apparatus.

Another object of the present invention is to provide an improved a seat reclining apparatus for a vehicle which apparatus can effectively overcome problems which stem from the fact that output shaft of the motor is rotated when the seat back falls forward.

An aspect of the present invention resides in a seat reclining apparatus for a vehicle which apparatus includes a stationary bracket integral with a seat cushion. A movable bracket is provided integral with a seat back and equipped with a driving device. A speed-reduction unit includes: an input shaft at which the speed-reduction unit is connected to the driving device; a stationary member attached to the stationary bracket; and a movable member rotatable relative to the stationary member. The movable member is adapted to output a rotation inputted from the input shaft upon reducing a speed of the rotation. A forward-inclination mechanism is provided including: a lock plate attached integral with the movable member; an engaging-disengaging device provided for bringing the lock plate and the movable bracket rotatable relative to the lock plate into one of an engagement state and a disengagement state, the engagement state allowing the movable bracket and the lock plate to so engage with each other as to rotate together with each other, the disengagement state allowing the movable bracket and the lock plate to so disengage from each other as to rotate relative to each other; and a restrictive device provided for restricting a range of rotational movement of the movable bracket relative to the stationary bracket. The movable bracket is connected to the stationary bracket through the speed-reduction unit and the forward-inclination mechanism. This seat reclining apparatus is further provided with a limit switch adapted to power off the driving device when the movable bracket and the lock plate are brought into the disengagement state.

According to the present invention, merely when the seat back is arbitrarily set to have a desired angle, the forward-inclination mechanism is in the engagement state. More specifically, when the input shaft is rotated by the driving device, a rotation inputted from the input shaft is outputted to the movable member upon being reduced in speed. Then, the movable member rotationally inclines the seat back through the movable bracket.

According to the present invention, the seat back can fall forward by an action of the engaging-disengaging device. More specifically, the seat back can be inclined forward together with the movable bracket in such a manner as to disengage the movable bracket from the lock plate by the engaging-disengaging device, whichever position the movable bracket is located.

DETAILED DESCRIPTION OF THE INVENTION

Referring now to the accompanying drawings, an embodiment of a seat reclining apparatus according to the present invention is illustrated.

Figure 2:
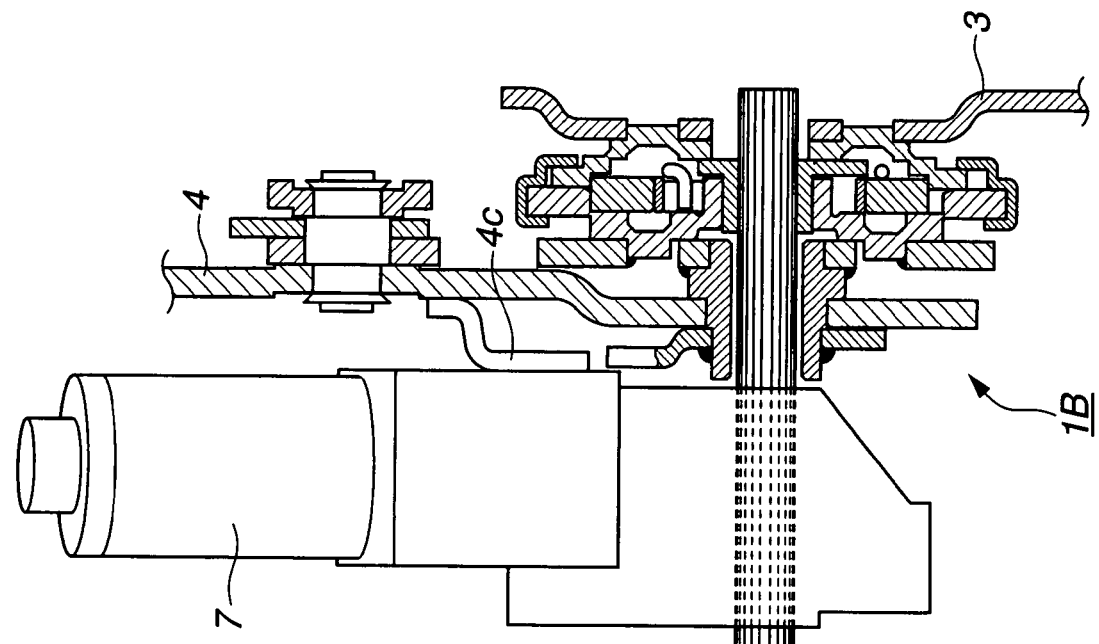
FIG. 2 is a cross-sectional view of seat reclining units each of which is disposed at left and right ends of the seat reclining apparatus of FIG. 1.
Figure 2:
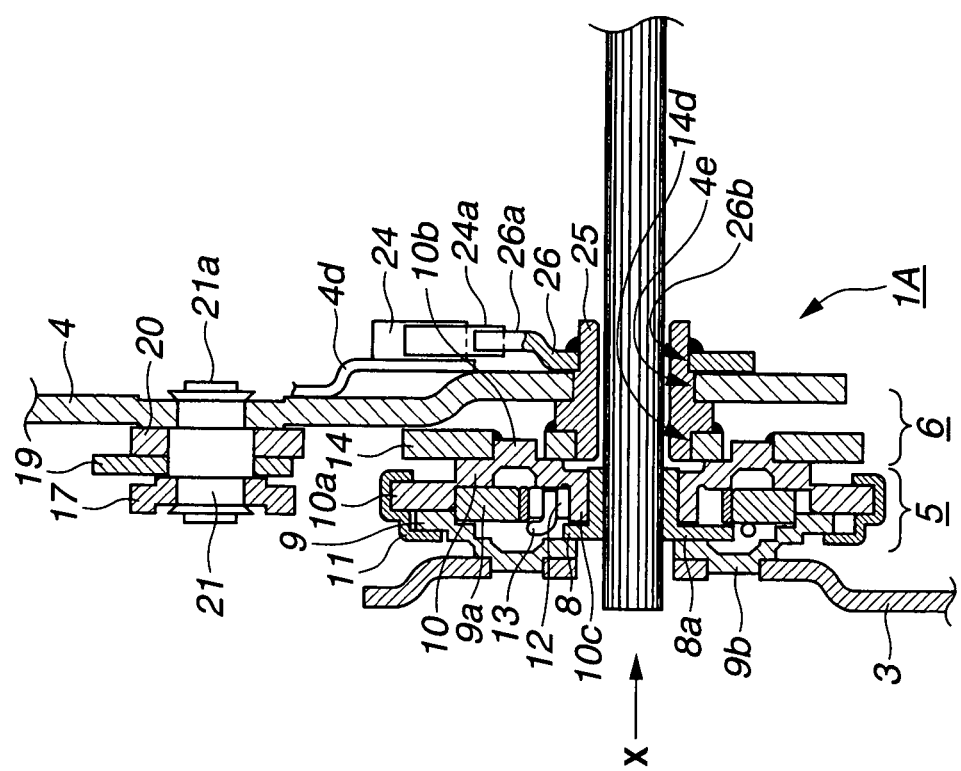

FIG. 2 illustrates an arrangement of the embodiment of the seat reclining apparatus as a whole. The seat reclining apparatus is so arranged as to dispose seat reclining units 1A, 1B respectively on both of left and right sides of a vehicle seat not shown. The seat reclining units 1A, 1B are connected to each other through a connecting shaft 2.

A member illustrated by reference numeral 3 is a stationary bracket provided integral with a seat cushion. A member illustrated by reference numeral 4 is a movable bracket provided integral with a seat back. The seat back is attached between right-side and left-side movable brackets 4 while the seat cushion is attached between right-side and left-side stationary brackets 3, to be adapted to rotationally move (or incline) about the connecting shaft 2 with respect to the seat cushion.

Since the seat reclining units 1A, 1B are arranged generally symmetrical to each other, a discussion about arrangement will be made only on the seat reclining unit 1A, with reference to FIG. 1. The seat reclining unit 1A is provided such that the movable bracket 4 is connected to the stationary bracket 3 through a speed-reduction unit 5 and a forward-inclination mechanism 6. The speed-reduction unit 5 is connected through the connecting shaft 2 to a motor 7 serving as a driving means (or a driving device).

Figure 3:
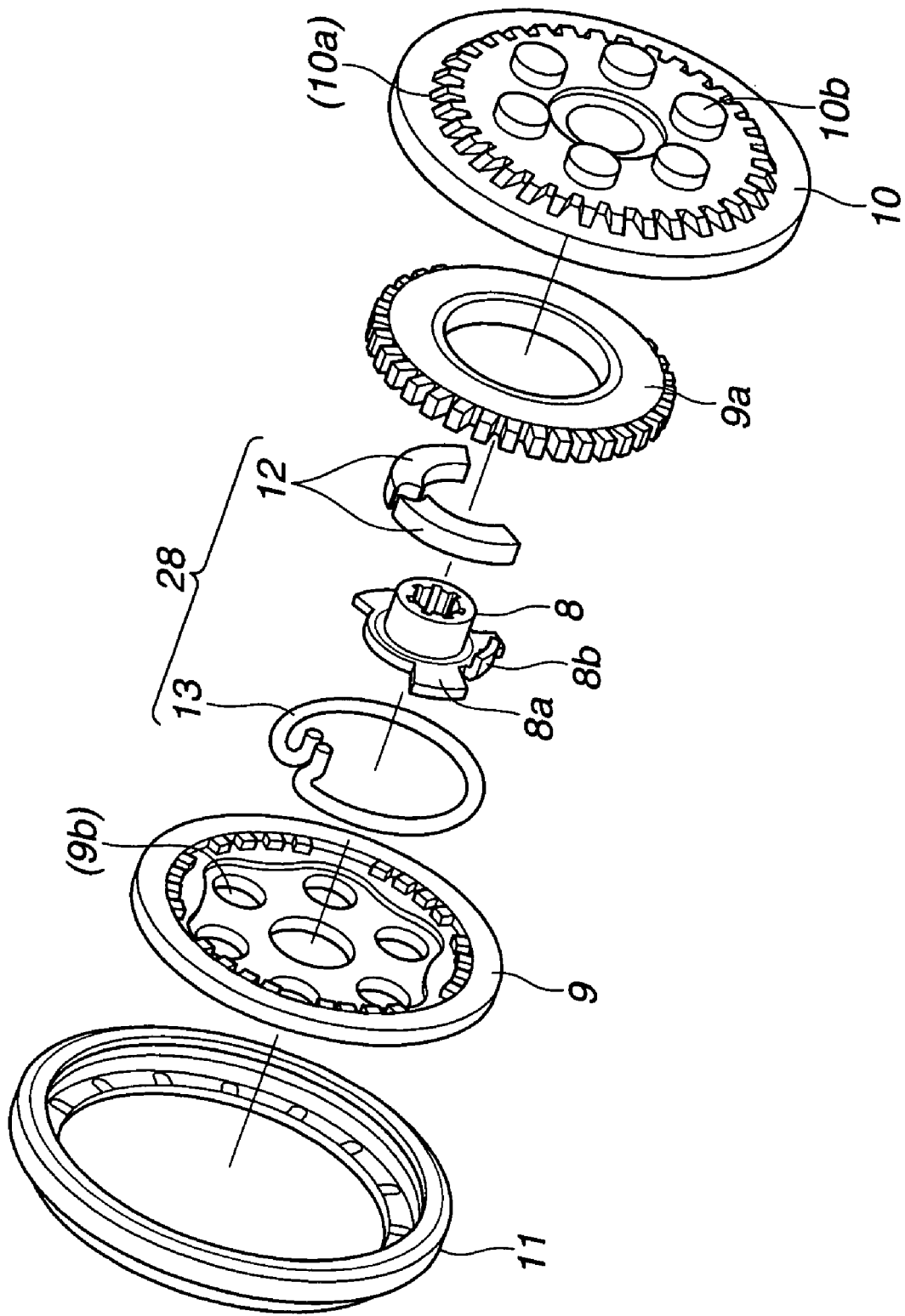
FIG. 3 is an exploded perspective view of a speed-reduction unit that the seat reclining apparatus includes as shown in FIG. 1.

An arrangement of the speed-reduction unit 5 will be discussed with reference to FIG. 3. The speed-reduction unit 5 is arranged including a center shaft 8 which is connected to the motor 7 thereby serving as an input shaft. A base plate 9 is fixed to the stationary bracket 3 thereby serving as a stationary member. An internal gear 10 serves as a movable member which can rotate relative to the base plate 9, and is adapted to output a rotation inputted from the center shaft 8 upon reducing its rotational speed. An external gear 9a is coaxial with and press-fitted in the base plate 9 shallowly, i.e., up to about half of the thickness of the external gear 9a, so as to be provided integral with the base plate 9. The internal gear 10 is formed depressed at its inner side to have an internal gear portion 10a thereat. The internal gear portion 10a is designed to have one or two more teeth than the external gear 9a.

In order to displace a mesh section at which the external gear 9a is meshed with the internal gear portion 10a along the circumference of the external gear 9a, the external gear 9a and the internal gear 10 are so arranged as to be rotatable with each other and to have an eccentricity therebetween, which is as follows. As shown in FIG. 2, the internal gear 10 has a cylindrical portion 10c protruding from a center portion of the internal gear 10 in an axial direction, and additionally the center shaft 8 is inserted into the cylindrical portion 10c. An eccentric drive mechanism part 28 is disposed between the cylindrical portion 10c and the external gear 9a.

The eccentric drive mechanism part 28 is arranged including a pair of pieces 12, and a spring 13 for biasing the pair of pieces 12 in such directions that they keep a distance from each other. Further, the center shaft 8 has a flange section 8a, and a push section 8b protruding in an axial direction from the flange section 8a. The push section 8b is provided for pushing the pair of pieces 12 in a circumferential direction from one direction thereby rotationally displace them. The pair of pieces 12 is thus pushed by the push section 8b so as to be displaced while in slidably contact with an outer peripheral surface of the cylindrical portion 10c, which means that the pair of pieces 12 is rotated together with the center shaft 8. With the rotational movement of the pair of pieces 12, the external gear 9a is pushed radially outwardly and is rotationally displaced along and inside the circumference of the internal gear 10 while maintaining mesh contact with the internal gear portion 10a. The external gear 9a is thus driven with the eccentricity with respect to the internal gear 10.

The base plate 9 and the internal gear 10 are held by a holder 11 serving as a holding member in such a manner as to be coaxial with and rotatable relative to each other, thereby being restricted in the axial direction. The speed-reduction unit 5 is attached to the stationary bracket 3 such that six columnar projections 9b formed on the base plate 9 are fittingly connected to six fit holes 3d defined by the stationary bracket 3, by welding, respectively.

The forward-inclination mechanism is arranged including a lock plate 14 attached integral with the internal gear 10. An engaging-disengaging means (or device) 15 is provided for bringing the lock plate 14 and the movable bracket 4 (rotatable relative to the lock plate 14) into an engagement state in which the lock plate 14 and the movable bracket 4 are allowed to rotate together with each other, or into a disengagement state in which the lock plate 14 and the movable bracket 4 are allowed to rotate relative to each other. Additionally, a restrictive means (or restrictive device) 16 is provided for restricting a range of rotational movement of the movable bracket 4 relative to the stationary bracket 3.

The lock plate 14 is formed with six fit holes 14e to which six columnar projections 10b formed on the internal gear 10 are fittingly connected by welding. Further, the lock plate 14 is formed with protrusions 14a, 14b at each of two positions located on an outer peripheral surface of the lock plate 14, and a depression section 14c between the protrusions 14a, 14b. The protrusions 14a, 14b and the depression section 14c serve as parts constituting the engaging-disengaging means 15, as described later.

The engaging-disengaging means 15 is arranged as follows. As shown in FIG. 2, the lock plate 14 has a center section defining a shaft hole 14d. The movable bracket 4 has a lower section defining a shaft hole 4e. In order to support the movable bracket 4 rotatable relative to the lock plate 14, a collar 25 is fittingly connected to the inner surface of the shaft hole 14d of the lock plate 14 by welding at its one end portion, while being inserted and connected to the shaft hole 4e of the movable bracket 4 and a shaft hole 26b defined by the washer 26 by welding at the other end portion. With this, the movable bracket 4 is allowed to rotate relative to the lock plate 14 and the collar 25.

Figure 1:
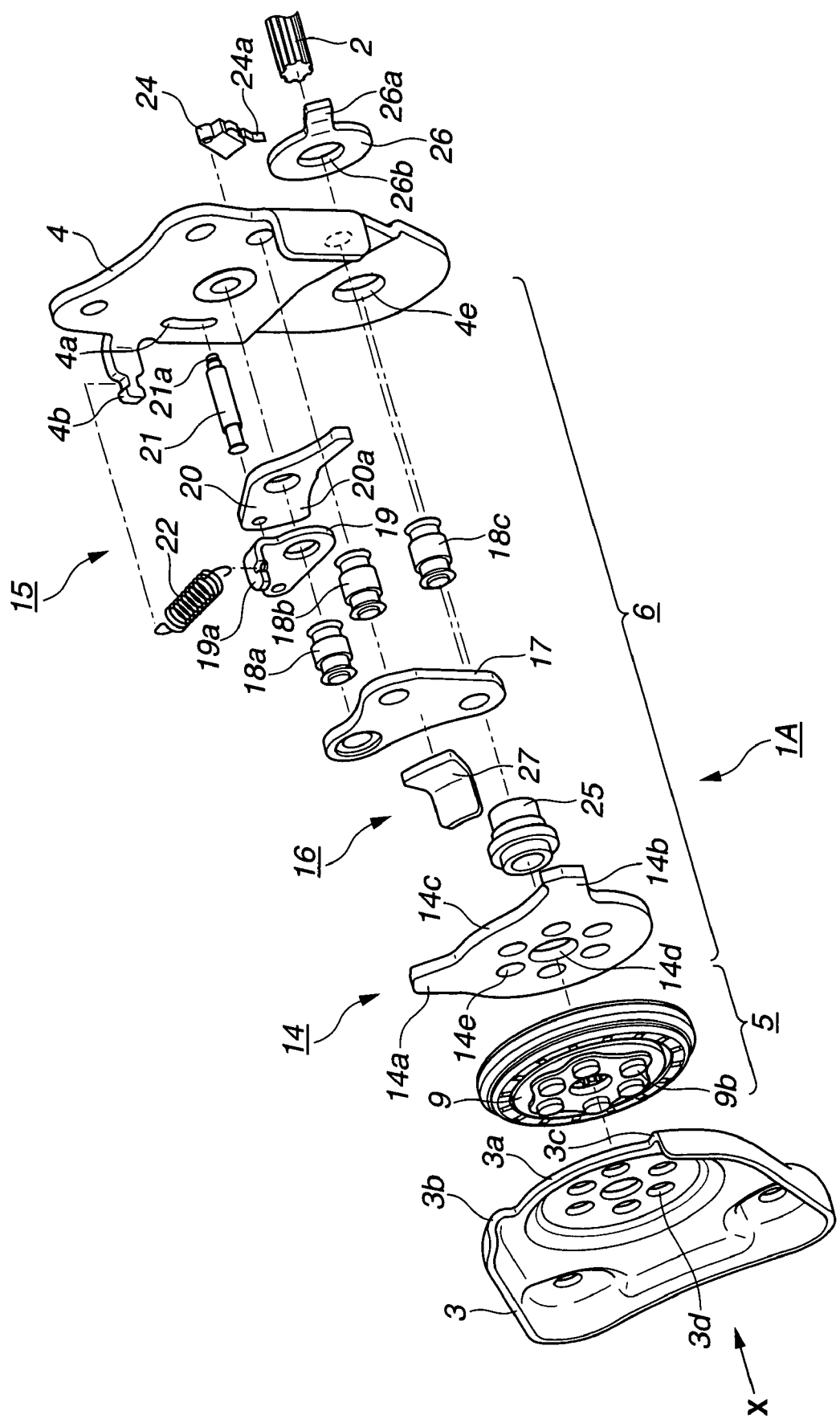
FIG. 1 is a fragmentary, exploded perspective view of an embodiment of a seat reclining apparatus for a vehicle, according to the present invention.

As shown in FIG. 1, a support plate 17 (generally triangular as viewed from an axial direction of the connecting shaft 2) is attached to the movable bracket 4 through three shaft pins 18a, 18b and 18c which are disposed generally at the apexes of the triangular support plate 17. A lever 19 and a latch 20 are disposed between the movable bracket 4 and the support plate 17 in a state of being rotatably supported by the shaft pin 18a, and additionally penetrated by a pin 21 thereby being connected integral with each other. The movable bracket 4 is formed with an opening 4a (arcuate as viewed from the axial direction of the connecting shaft 2) into which a free end 21a that the pin 21 has is inserted to penetrate the movable bracket 4. The latch is formed having a contact section 20a where the latch is brought into contact with the protrusion 14a. In order to bias the contact section 20a in a direction to engage with the protrusion 14a, a spring 22 is disposed between a spring hook portion 4b formed protruding from the movable bracket 4 and a spring hook portion 19a formed protruding from the lever 19, in such a manner as to always bias the lever 19 and the latch 20 counterclockwise (as viewed from a direction indicated by an arrow X in FIG. 1) around the shaft pin 18a.

As discussed above, the lock plate 14 is formed with the depression section 14c. When the shaft pin 18c (installed to the movable bracket 4) and the contact section 20a of the latch 20 are located inside a space defined by the depression section 14c and the protrusions 14a, 14b, and when the contact section 20a is in contact with the protrusion 14a while the shaft pin 18c is in contact with the protrusion 14b, the movable bracket 4 is brought into contact with the lock plate 14 to establish the engagement state. When the contact section 20a of the latch 20 under the engagement state is pulled out of the space defined by the depression section 14c and the protrusions 14a, 14b by pulling up the free end 21a of the pin 21 against the biasing force of the spring 22, the contact section 20a is to be disengaged from the protrusion 14a. With this, the movable bracket 4 is disengaged from the lock plate 14, which allows the seat back to fall forward.

The above-discussed restrictive means 16 is arranged as follows. Though the movable bracket 4 is adapted to rotationally incline with respect to the stationary bracket 3, a range of the rotational inclination of the movable bracket 4 with respect to the stationary bracket 3 is restricted. More specifically, the stationary bracket 3 is formed with a recess portion 3a (arcuate as viewed from an axial direction of the connecting shaft 2) at its outer peripheral portion. The stationary bracket 3 further is formed with restrictive portions 3b, 3c at both ends of the recess portion 3a while a stopper 27 is attached to the support plate 17 by welding. The movable bracket 4 is therefore allowed to rotationally move within a range that the stopper 27 can move inside a space defined by the recess portion 3a and restrictive portions 3b, 3c.

The speed-reduction unit 5 is connected to the motor 7 as discussed above. The structure in such a connection will be discussed. As shown in FIG. 2, both ends of the connecting shaft 2 are respectively inserted into the collars 25 of the left-side and right-side seat reclining units 1A, 1B and spline-connected to the center shaft 8. The motor 7 is housed in the seat back (not shown) and installed to an inner surface of the movable bracket 4 of the seat reclining unit 1B through a metallic installation piece 4c, the inner surface of the movable bracket 4 facing the seat reclining unit 1A. A speed-reduction mechanism is integrated into the motor 7, and additionally an output shaft of the motor 7 has spline teeth on its inner peripheral surface and is disposed coaxial with the left-side and right-side center shafts 8. The above-discussed connecting shaft 2 is spline-fitted to and penetrates the output shaft. Meanwhile, a limit switch 24 is disposed through a metallic installation piece 4d to an inner surface of the opposite movable bracket 4, i.e., the movable bracket 4 of the seat reclining unit 1A, the inner surface of the movable bracket 4 facing the seat reclining unit 1B. The limit switch 24 is adapted to power off the motor 7 when the movable bracket 4 is disengaged from the lock plate 14 and when the seat back falls forward. A push part is provided to the lock plate side for pushing the limit switch 24 at an operative section 24a. More specifically, the washer 26 adapted to rotate together with the lock plate 14 is formed with a push part 26a protruding from the washer 26.

Operation of the seat reclining apparatus 1 for the vehicle will be now discussed.

According to the present invention, merely when the seat back is arbitrarily set to have a desired angle, the contact section 20a of the latch 20 is in contact with the protrusion 14a of the lock plate 14 in the forward-inclination mechanism 6, so that the engagement state between the movable bracket 4 and the lock plate 14 is maintained. At this time, the speed-reduction unit 5 alone is operated. More specifically, when the output shaft of the motor 7 is rotated in one direction, the rotational force generated thereby is transmitted to each the center shaft 8 of the left-side and right-side seat reclining units 1A,1B through the connecting shaft 2.

In the seat reclining units 1A, 1B, when the center shaft 2 is rotated, the pair of pieces 12 is pushed by the push section 8b of the center shaft 8 thereby to be rotated without producing any clearance between the members by virtue of the biasing force of the spring 13. The external gear 9a is designed to have one or two less teeth than the internal gear portion 10a, so that a mesh section (that the external gear 9a has at its outer peripheral section corresponding to the pair of pieces 12) at which the external gear 9a is meshed with the internal gear portion 10a of the internal gear 10 is displaced along the circumference of the external gear 9a by such a rotation of the pair of pieces 12. Specifically, the stationary bracket 3 is rotated relative to the movable bracket 4 provided with the motor 7, together with the external gear 9a having less teeth than the internal gear 10 in a direction opposite to the rotational direction of the connecting shaft 2, upon being more reduced in speed than the movable bracket 4 to such an extent as to correspond to one or two teeth. In other words, the internal gear 10, the movable bracket 4 and the seat back are rotated relative to the stationary members (i.e., the stationary bracket 3 and the base plate 9) in the same direction as the rotational direction of the connecting shaft 2 upon being reduced in speed.

Figure 4:
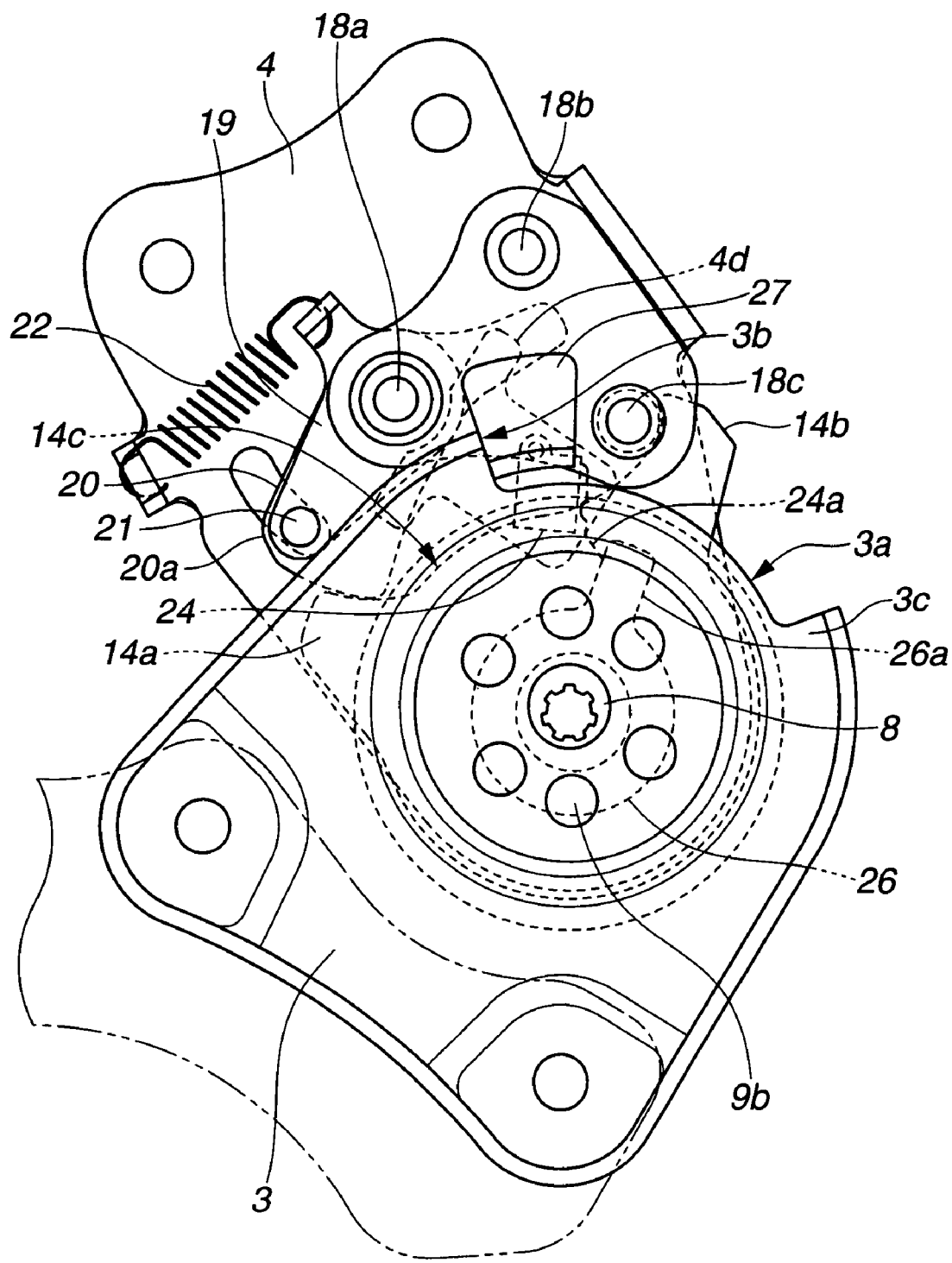
FIG. 4 is an explanatory view of the seat reclining apparatus as viewed from a direction indicated by arrow X in FIG. 1 or FIG. 2, showing a state where a seat back is inclined to be in a most forward position.
Figure 5:
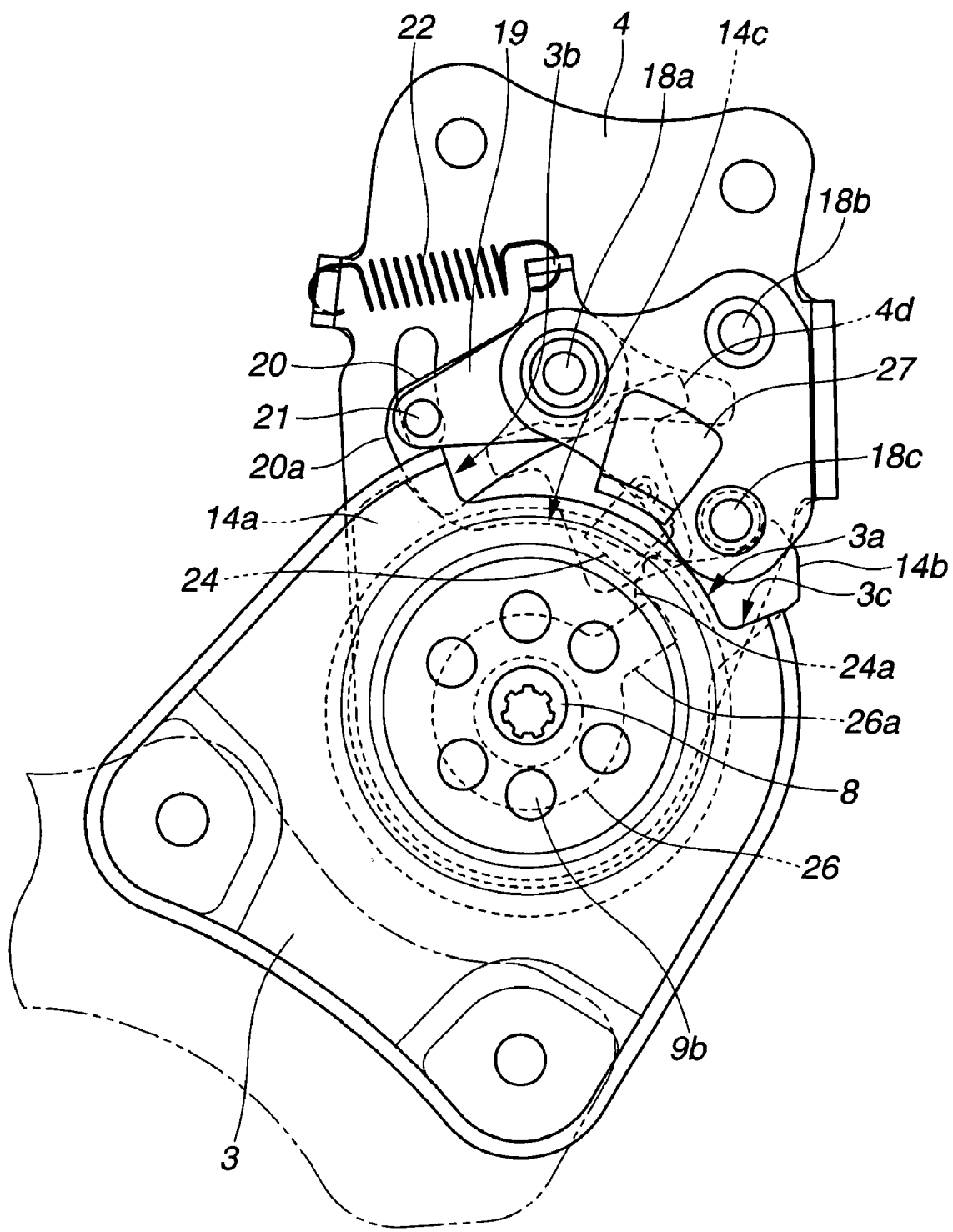
FIG. 5 is an explanatory view similar to FIG. 4, but showing a state where the seat back occupies a neutral position.
Figure 6:
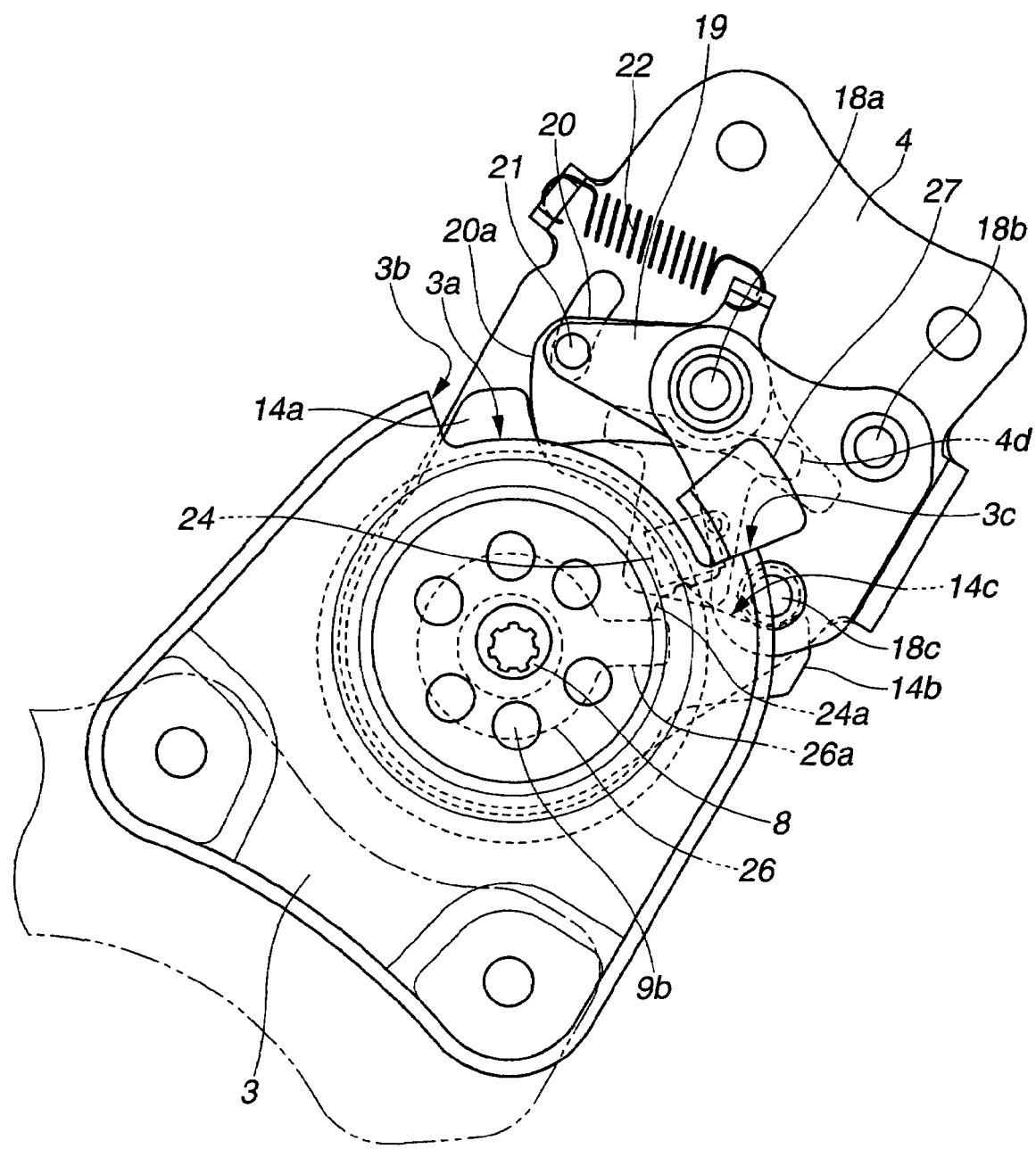
FIG. 6 is an explanatory view similar to FIG. 4, but showing a state where the seat back is inclined to be in a most rearward position.

FIGS. 4 to 6 each show a state in which the seat back is inclined to have some angle with respect to the seat cushion. FIG. 4 illustrates a state where the seat back is inclined to be in a most forward position. FIG. 5 illustrates a state where the seat back is in a neutral position. Additionally, FIG. 6 illustrates a state where the seat back is inclined to be in a most rearward position. In any of these states, the movable bracket 4 is rotated together with the lock plate 14 and the washer 26. Therefore, the operative section 24a of the limit switch 24 provided to the movable bracket 4 is in a condition of being pushed by the push part 26a of the washer 26, which maintains a status where the limit switch 24 is turned on. In FIG. 4, the stopper 27 fixed to the movable bracket 4 is in contact with the restrictive portion 3b inside the space defined by the recess portion 3a and the restrictive portions 3b, 3c. In FIG. 5, the stopper 27 occupies a mid position of this space. In FIG. 6, the stopper 27 is in contact with the restrictive portion 3c inside this space.

Operation for inclining the seat back forward is carried out as follows. When the free end 21a of the pin 21 provided with the engaging-disengaging means 15 is pulled up, the lever 19 and the latch 20 are rotated clockwise (in FIGS. 4 to 6) about the shaft pin 18a against the biasing force of the spring 22. With this, the contact section 20a of the latch 20 is moved upward and away from the protrusion 14a of the lock plate 14 so that the movable bracket 4 can be disengaged from the lock plate 14, whichever position the movable bracket 4 in engagement with the lock plate 14 is located. In a case where the movable bracket 4 is thus disengaged from the lock plate 14 under the state shown in FIG. 5, it is possible to rotationally incline the seat back together with the movable bracket 4 with respect to the lock plate 14 while intercepting the lock plate 14 at the position shown in FIG. 5. In this case, the rotational inclination of the seat back is stopped by the stopper 27 brought into contact with the restrictive portion 3b, as shown in FIG. 7.

Figure 7:
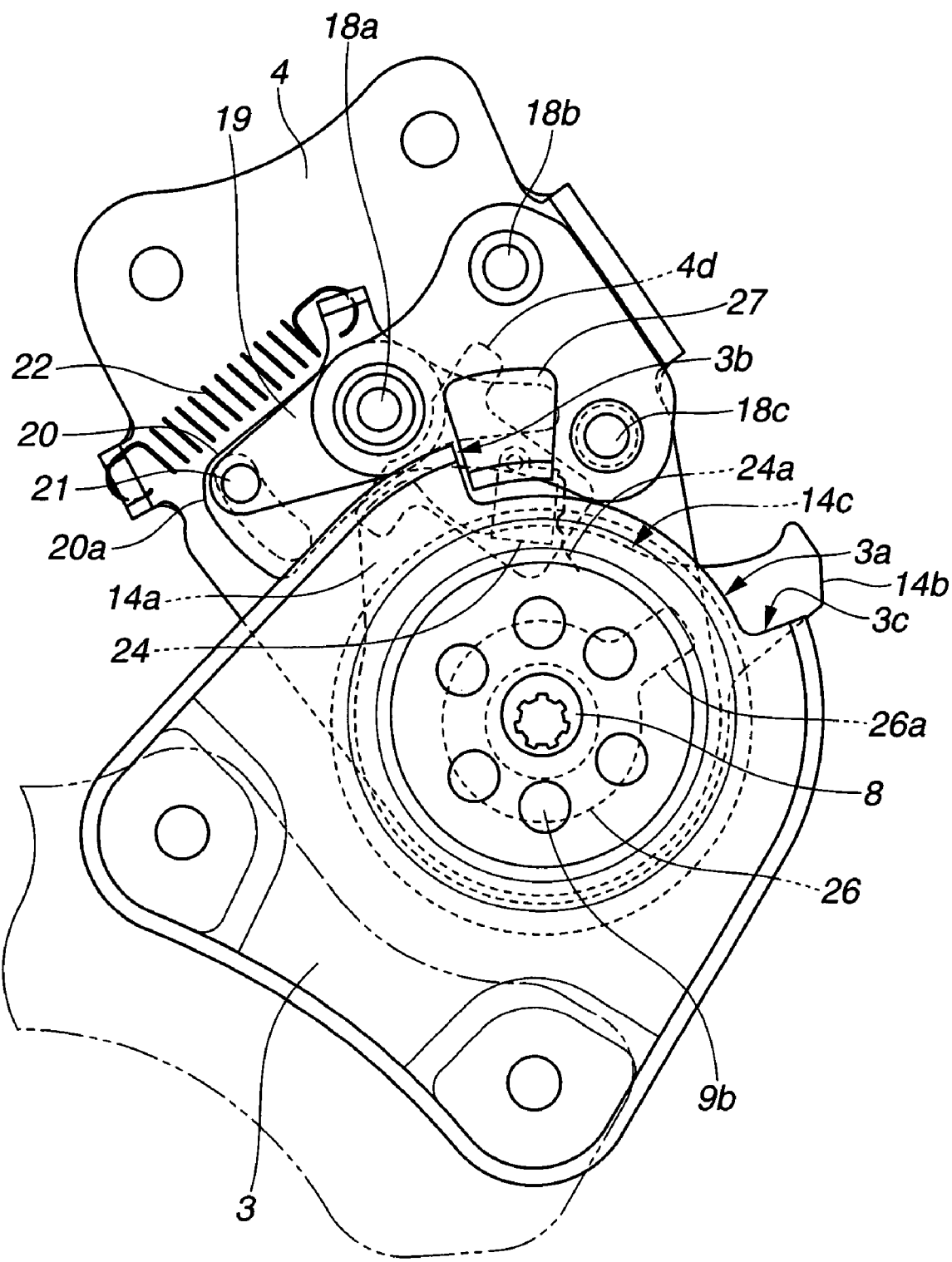
FIG. 7 is an explanatory view similar to FIG. 4, but showing a state where the seat back is inclined forward while a movable bracket is disengaged from a lock plate.

During the forward-inclination operation for the seat back as discussed above, the movable bracket 4 is to be disengaged from the lock plate 14 and to be rotated relative to the lock plate 14 counterclockwise, as shown in FIG. 7. Therefore, the operative section 24a of the limit switch 24 attached to the movable bracket 4 is released from the push part 26a of the washer 26 attached to the lock plate 14. With this, the motor 7 is powered off and therefore is not operated, so that it is impossible to rotate the lock plate 14 by the motor 7.

Figure 8:
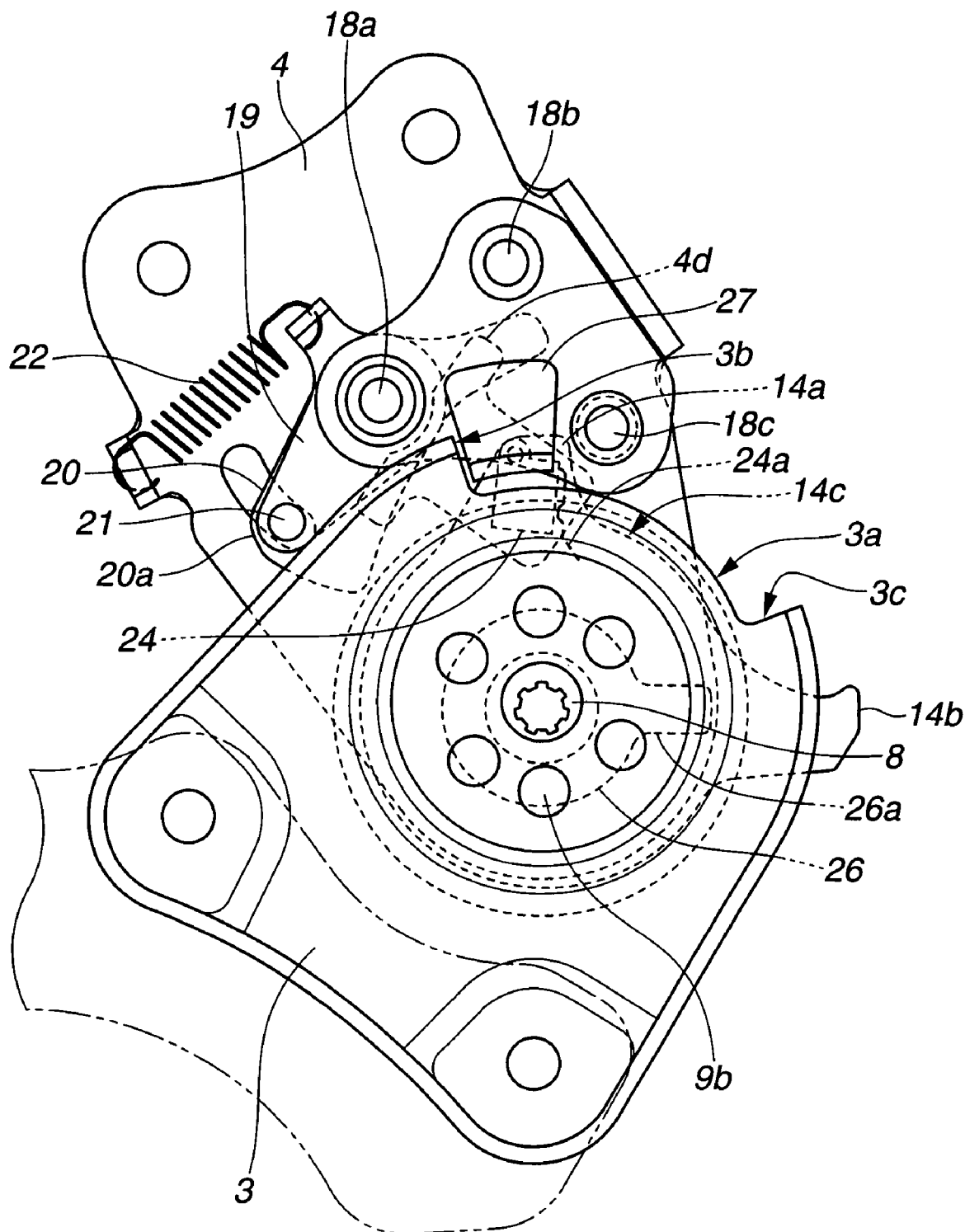
FIG. 8 is an explanatory view similar to FIG. 7, but showing a state where the lock plate alone is in the most rearward position.

The disengagement state of the movable bracket 4 from the lock plate 14 operates the limit switch 24 to power off the motor 7, so that there never arises a situation where the lock plate 14 is erroneously rotated by the motor 7 under a state where the seat back is inclined forward. Accordingly, in a case as shown in FIG. 8 in which the seat back is rotationally inclined forward from the most rearward position as shown in FIG. 6, there never arises a situation where the lock plate 14 is rotated clockwise (or further rearward) from the most rearward position as shown in FIG. 6, more specifically, the engagement between the movable bracket 4 and the lock plate 14 never be made impossible.

Additionally, the limit switch 24 is adapted to detect a status of the seat back inclined forward. This detecting function can be utilized, for example, as a controlling means by which an upper rail used in a seat sliding apparatus (not shown) is displaced together with the seat to a most forward position in a vehicle.

As discussed above, the seat reclining apparatus according to the present invention is not provided with such a stopper as to restrict a range of the rotational movement of the lock plate 14. Therefore, even if the output shaft of the motor 7 is rotated together with the seat back in raising the seat back up, there never arises a situation where the output shaft is pried to rupture a driving section of the motor 7. Further, the disengagement between the movable bracket 4 and the lock plate 14 operates the limit switch 24 so as to power off the motor 7 even without such a stopper, so that the motor 7 never be erroneously operated in a state where the seat back is inclined forward. More specifically, there never arises a case where the lock plate 14 is excessively rotated to make the engagement impossible. As has been discussed, the lock plate 14 occupies a range allowing the engagement state without being excessively rotated while the movable bracket 4 is restricted in rotational movement range by the restrictive means. Therefore, the engagement between the movable bracket 4 and the lock plate 14 is reliably achieved.

Technical ideas (a) and (b) disclosed in the above embodiment will be discussed together with advantages obtained thereby.

(a) A seat reclining apparatus for a vehicle comprises a stationary bracket integral with a seat cushion. A movable bracket is provided integral with a seat back and equipped with a driving device. A speed-reduction unit includes: an input shaft at which the speed-reduction unit is connected to the driving device; a stationary member attached to the stationary bracket; and a movable member rotatable relative to the stationary member. The movable member is adapted to output a rotation inputted from the input shaft upon reducing a speed of the rotation. A forward-inclination mechanism is provided including: a lock plate attached integral with the movable member; an engaging-disengaging device provided for bringing the lock plate and the movable bracket rotatable relative to the lock plate into one of an engagement state and a disengagement state, the engagement state allowing the movable bracket and the lock plate to so engage with each other as to rotate together with each other, the disengagement state allowing the movable bracket and the lock plate to so disengage from each other as to rotate relative to each other; and a restrictive device provided for restricting a range of rotational movement of the movable bracket relative to the stationary bracket. The movable bracket is connected to the stationary bracket through the speed-reduction unit and the forward-inclination mechanism. This seat reclining apparatus is further provided with a limit switch adapted to power off the driving device when the movable bracket and the lock plate are brought into the disengagement state.

A seat reclining apparatus according to the idea (a) is not provided with such a stopper as to restrict a range of a rotational movement of the lock plate. Therefore, even if the output shaft of the driving device is rotated together with the seat back by raising the seat back up thereby rotating the lock plate, the output shaft never be pried, so that the output shaft itself and a driving section of the driving device are prevented from fracture. Further, this apparatus is equipped with such a limit switch as to power off the driving device when the movable bracket is brought into disengagement from the lock plate, the driving device never be operated when the seat back falls forward under the disengagement state. Therefore, the lock plate never deviates from an area allowing the engagement state, while the movable bracket never deviates from the area allowing the engagement state since a range of the rotational movement of the movable bracket is restricted by the restrictive device. With this, the movable bracket is reliably brought into engagement with the lock plate.

Moreover, arrangements of the speed-reduction unit and the forward-inclination mechanism are independent from each other, so that commonality of the speed-reduction unit is achieved whether or not the arrangement of the forward-inclination mechanism is applied. In addition, this apparatus can employ either of an electrically operative manner and a manually operative manner as a manner of angularly adjusting the seat back. The former applies the driving device or a motor, and the latter applies a lock-unlock mechanism in which the seat back can be manually inclined upon being released from a lock state and is locked again. This apparatus can accomplish the commonality of components used in both the above manners.

(b) In the seat reclining apparatus as discussed in the idea (a), the limit switch has an operative section and is provided to one of the movable bracket and the lock plate. Meanwhile, the other of the movable bracket and the lock plate is provided with a push part for pushing the operative section of the limit switch.

According to the idea (b), when the movable bracket is disengaged from the lock plate in a forward-inclination operation for the seat back, the movable bracket rotates relative to the lock plate. At this time, the operative section of the limit switch provided to one of the movable bracket and the lock plate is released from the push part provided to the other of them thereby powering off the driving device or a motor. Therefore, this arrangement is to contribute to detection of a condition of the seat back inclined forward.

The entire contents of Japanese Patent Application P2006-51935 (filed Feb. 28, 2006) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. For example, it will be understood that the base plate may be attached to the seat back, tough attached to the seat cushion in the above embodiment. Moreover, in the above embodiment the limit switch is provided to the movable bracket while the push part is provided to the lock plate, but they may be provided upon replacement with each other. Specifically, it will be understood that the limit switch is provided to the lock plate while the push part is provided to the movable bracket. The scope of the invention is defined with reference to the following claims.

What is claimed is:

1. A seat reclining apparatus for a vehicle, comprising:
   (a) a stationary bracket provided integrally with a seat cushion;
   (b) a movable bracket provided integrally with a seat back and equipped with a driving device;
   (c) a speed-reduction unit including:
      (1) an input shaft at which the speed-reduction unit is connected to the driving device,
      (2) a stationary member attached to the stationary bracket, and
      (3) a movable member rotatable relative to the stationary member, the movable member being adapted to output a rotation inputted from the input shaft upon reducing a speed of the rotation;
   (d) a forward-inclination mechanism including:
      (1) a lock plate rotatable relative to the movable bracket, the lock plate being attached integrally with the movable member,
      (2) an engaging-disengaging device provided to bring the lock plate and the movable bracket into one of an engagement state and a disengagement state, the engagement state allowing the movable bracket and the lock plate to so engage with each other as to rotate together with each other, the disengagement state allowing the movable bracket and the lock plate to so disengage from each other as to rotate relative to each other, and
      (3) a restrictive device provided for restricting a range of rotational movement of the movable bracket relative to the stationary bracket, the movable bracket being connected to the stationary bracket through the speed-reduction unit and the forward-inclination mechanism; and
   (e) a limit switch for powering off the driving device when the movable bracket and the lock plate are brought into the disengagement state.

2. A seat reclining apparatus for a vehicle, as claimed in claim 1, wherein the limit switch has an operative section and is provided to one of the movable bracket and the lock plate, wherein other of the movable bracket and the lock plate is provided with a push part for pushing the operative section of the limit switch.

* * * * *